US008573269B2

(12) United States Patent
Mita

(10) Patent No.: US 8,573,269 B2
(45) Date of Patent: Nov. 5, 2013

(54) PNEUMATIC TIRE WITH TREAD HAVING CONTINUOUS RIBS AND A BLOCK ROW

(75) Inventor: Masaya Mita, Hiratsuka (JP)

(73) Assignee: The Yokohama Rubber Co., Ltd. (JP)

( * ) Notice: Subject to any disclaimer, the term of this patent is extended or adjusted under 35 U.S.C. 154(b) by 865 days.

(21) Appl. No.: 12/708,164

(22) Filed: Feb. 18, 2010

(65) Prior Publication Data

US 2010/0212792 A1 Aug. 26, 2010

(30) Foreign Application Priority Data

Feb. 20, 2009 (JP) .................................. 2009-037479
Jan. 8, 2010 (JP) .................................. 2010-002849

(51) Int. Cl.
*B60C 11/03* (2006.01)
(52) U.S. Cl.
USPC ................. 152/209.8; 152/209.9; 152/209.15
(58) Field of Classification Search
USPC .............................. 152/209.8, 209.9, 209.15; D12/519–524
See application file for complete search history.

(56) References Cited

U.S. PATENT DOCUMENTS

| 7,631,675 | B2 | 12/2009 | Ikegami | |
|---|---|---|---|---|
| 2008/0142133 | A1* | 6/2008 | Ochi | 152/209.8 |
| 2009/0178745 | A1* | 7/2009 | Ikegami | 152/209.8 |

FOREIGN PATENT DOCUMENTS

| JP | 62-103205 | | 1/1982 |
|---|---|---|---|
| JP | 57-004409 | | 5/1987 |
| JP | 2007-237795 | | 9/2007 |
| JP | 2007-237795 A | * | 9/2007 |
| JP | 2008-195100 A | * | 8/2008 |
| JP | 2008-273451 | | 11/2008 |
| JP | 2009-006833 | | 1/2009 |
| JP | 2009-006833 A | * | 1/2009 |
| JP | 4213197 B1 | * | 1/2009 |
| WO | WO 2005/032855 | | 4/2005 |
| WO | WO2006/033383 | | 3/2006 |
| WO | WO-2007/028442 A1 | * | 3/2007 |

OTHER PUBLICATIONS

Machine translation for Japan 2008-195100 (no date).*
Machine translation for WO 2007/028442 (no date).*
Machine translation for Japan 2007-237795 (no date).*
Machine translation for Japan 2009-006833 (no date).*
English translation of German Patent and Trademark Office Action, Case No. 10 2010 001 901.1; dated Sep. 29, 2011.

* cited by examiner

*Primary Examiner* — Steven D Maki
(74) *Attorney, Agent, or Firm* — Thorpe North & Western LLP

(57) ABSTRACT

A pneumatic tire including five land portions in a tread surface 1 by providing four main grooves in a ground contact region of the tread surface, wherein positions and groove widths of the main grooves are specified together with only one land portion positioned outermost on a vehicle outer side when mounted on a vehicle being formed into a block row, and the other land portions being formed into ribs, and a groove area proportion of the tread surface is larger on a vehicle inner side than the vehicle outer side with a tire equator and center lines of some of the land portions as boundaries.

17 Claims, 7 Drawing Sheets

PNEUMATIC TIRE WITH TREAD HAVING CONTINUOUS RIBS AND A BLOCK ROW

PRIORITY CLAIM

This application is based upon and claims the benefit of priority from Japanese Patent Application No. 2010-002849, filed Jan. 8, 2010 and Japanese Patent Application No. 2009-037479, filed Feb. 20, 2009, the entire contents of both of which are incorporated herein by reference.

BACKGROUND OF THE INVENTION

1. Field of the Invention

The present invention relates to a pneumatic tire, and more specifically relates to a pneumatic tire that achieves a high level of performance in both steering stability performance on dry road surfaces and steering stability performance on wet road surfaces.

2. Description of the Related Art

In recent years, along with enhanced performance of vehicles, a high level of performance in both steering stability performance on dry road surfaces and steering stability performance on wet road surfaces when driving at high speed has become strongly desired for pneumatic tires.

Guaranteeing drainage by providing many lug grooves and sipes on a tread surface of a tire is normally performed as a method for improving steering stability performance on wet road surfaces. However, there is the problem that it is difficult to guarantee steering stability on dry road surfaces by such a method since a rigidity of land portions formed on the tread surface decreases.

In order to achieve a high level of both steering stability performance on dry road surfaces and steering stability performance on wet road surfaces, which have an opposing relationship, many suggestions have heretofore been made concerning tread pattern structures (for example, refer to PCT International Publication WO 2005/32855 and Japanese Patent Publication (A) No. 2008-273451).

However, it has become difficult to achieve a high level of both steering stability performance on dry road surfaces and steering stability performance on wet road surfaces when driving at high speed with conventional tread pattern structures due to a gradual increase in demand for increasing vehicular speed following advances in enhanced performance of vehicles and road maintenance in recent years, and further improvement is thus desired.

SUMMARY OF THE INVENTION

The object of the present invention is to overcome the aforementioned problem by providing a pneumatic tire that achieves a high level of both steering stability performance on dry road surfaces and steering stability performance on wet road surfaces.

In order to achieve the aforementioned object, the pneumatic tire of the present invention includes: four main grooves that are in a ground contact region of a tread surface and that extend linearly in a tire circumferential direction; and five land portions on the tread surface partitioned by the main grooves, wherein centers of two main grooves positioned on a tread center side among the four main grooves sandwich a tire equator and are formed in positions removed from the tire equator by from 8 to 12% of a tire ground contact width, centers of two main grooves positioned on both shoulder sides are formed in positions removed from the tire equator by from 18 to 32% of a tire ground contact width, a groove width of a main groove positioned at a first farthest tire width direction side is less than the groove widths of the other three main grooves so that a ratio Wmax/Wout of a maximum groove width Wmax of the three main grooves to a groove width Wout of the main groove positioned at the first farthest tire width direction side is set to from 2.0 to 3.0, only a land portion positioned at the first farthest tire width direction side among the five land portions is formed into a block row by being partitioned with lug grooves at a given spacing in the tire circumferential direction, and the other four land portions are formed into continuous ribs in the tire circumferential direction, moreover, a ratio Sin/Sout of a groove area proportion Sin on a second tire width direction side to a groove area proportion Sout on a first tire width direction side when the tire equator is taken as the center in the ground contact region is set to from 1.25 to 1.35, and groove area proportions of ground contact regions of the three land portions excluding those at the first farthest tire width direction side and a second farthest tire width direction side among the five land portions are larger in the second tire width direction side than the first tire width direction side with center lines of the land portions as boundaries.

Also, the aforementioned configuration is preferably constituted as disclosed in (1) to (6) below.

(1) Inclined grooves are formed in the three land portions excluding those at the second farthest tire width direction side and the first farthest tire width direction side among the five land portions, the inclined grooves extending from main grooves on the second tire width direction side toward the first tire width direction side and terminating in the land portions and formed at a given spacing in the tire circumferential direction, and lug grooves are formed in a land portion positioned at the second farthest tire width direction side, the lug grooves extending from the second tire width direction side toward the first tire width direction side and terminating in the land portion and formed at a given spacing in the tire circumferential direction.

(2) In the ground contact region of the three land portions excluding those at the second farthest tire width direction side and the first farthest tire width direction side among the five land portions, the difference in the groove area proportion between the second tire width direction side and the first tire width direction side of each land portion with the center line in the tire width direction as a boundary is from 4.5 to 5.5% for the land portion at the first farthest tire width direction side and from 12.0 to 14.0% for the other two land portions, respectively.

(3) In the ground contact region of the tread surface, the groove width of the lug grooves partitioning the land portion positioned at the first farthest tire width direction side are formed so as to gradually increase from the main groove positioned at the first farthest tire width direction side toward the first tire width direction side, and the ratio x/y of the maximum value x and the minimum value y of the groove width is from 1.4 to 2.5.

(4) Chamfers are formed in corners of an acute angle side formed by the inclined grooves and the main grooves.

(5) The tire circumferential direction spacing of the lug grooves in the land portion at the second farthest tire width direction side is less than the tire circumferential direction spacing of the lug grooves in the land portion at the first farthest tire width direction side.

(6) When mounted on a vehicle, the first tire width direction side is the vehicle outer side and the second tire width direction side is the vehicle inner side.

Since five land portions are formed by arranging four main grooves on the tread surface and the center position of these main grooves is specified together with only the land portion at the first farthest tire width direction side being formed into a block row and the other land portions being formed into ribs, the rigidity of the land portions on the tread surface is guaranteed, thus making improvement in steering stability performance on dry road surfaces possible with the present invention.

Also, since decrease in the rigidity of the land portion at the first farthest tire width direction side consisting of the block row is minimized by the main groove at the first farthest tire width direction side among the four main grooves being formed so as to have a groove width less than the other main grooves, drainage can be guaranteed by the arrangement of the lug grooves without a decrease in steering stability performance on dry roads, thus making improvement in steering stability performance on wet road surfaces possible.

Furthermore, since the groove area proportion of the second tire width direction side is larger than the groove area proportion of the first tire width direction side when the tire equator is taken as the center in the ground contact region of the tread surface and the ratio of these groove area proportions is set to from 1.25 to 1.35; and the groove area proportion of the ground contact region of the three land portions excluding those at the second farthest tire width direction side and the first farthest tire width direction side among the five land portions being larger on second tire width direction side than the first tire width direction side with the center lines of the land portions as boundaries, it is possible to achieve both steering stability performance on dry road surfaces and steering stability performance on wet road surfaces in good balance.

BEST MODE FOR CARRYING OUT THE INVENTION

Detailed descriptions will be given below of embodiments of the present invention with reference to the accompanying drawings.

Figure 1:
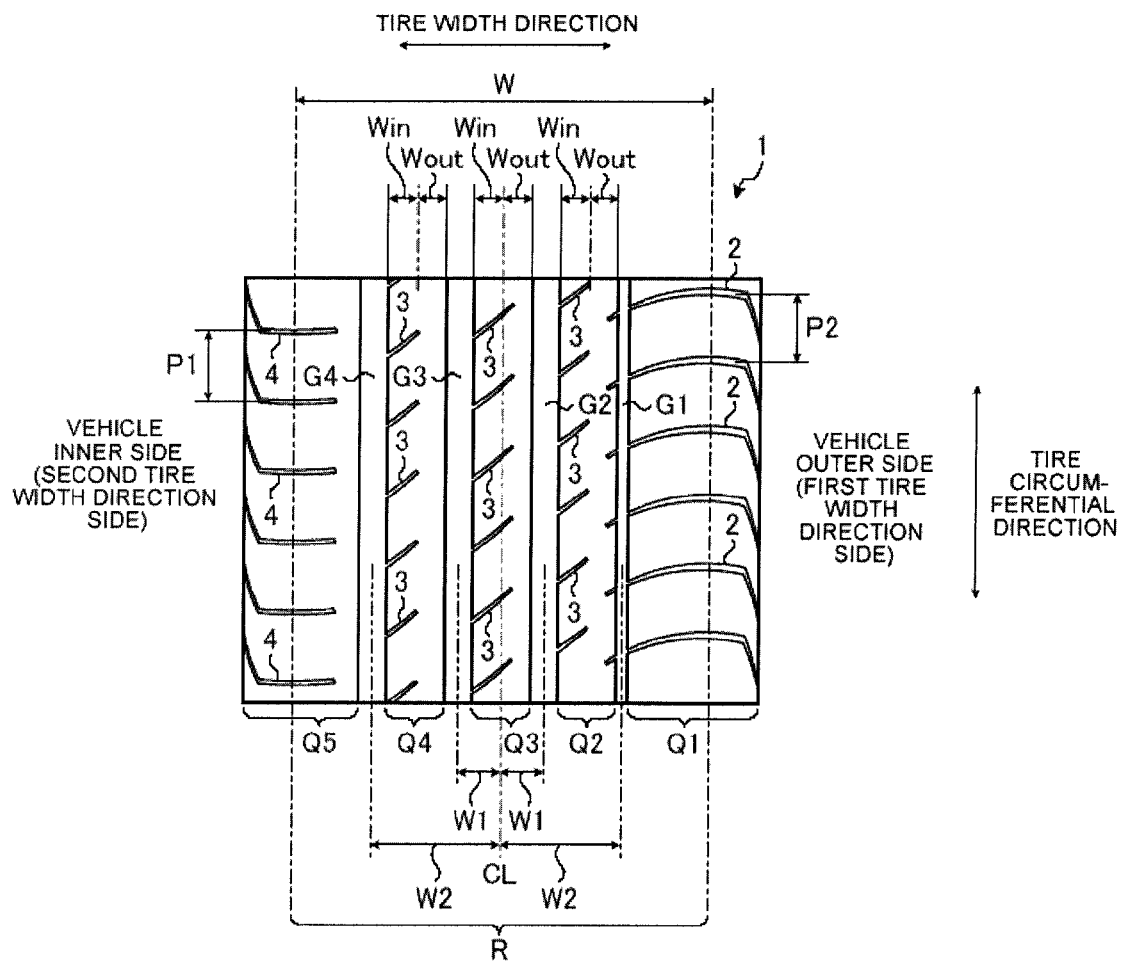
FIG. 1 is a plan view partially showing a tread surface of a pneumatic tire according to an embodiment of the present invention.
Figure 2:
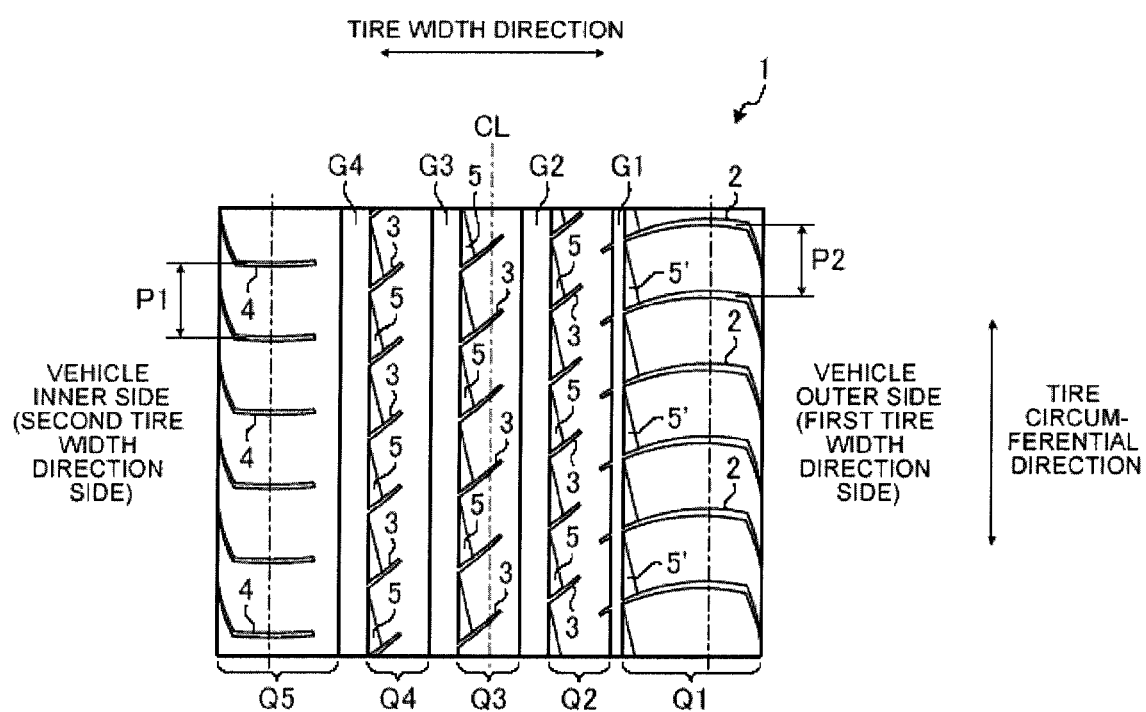
FIG. 2 is a plan view corresponding to FIG. 1 according to another embodiment of the present invention.
Figure 3:
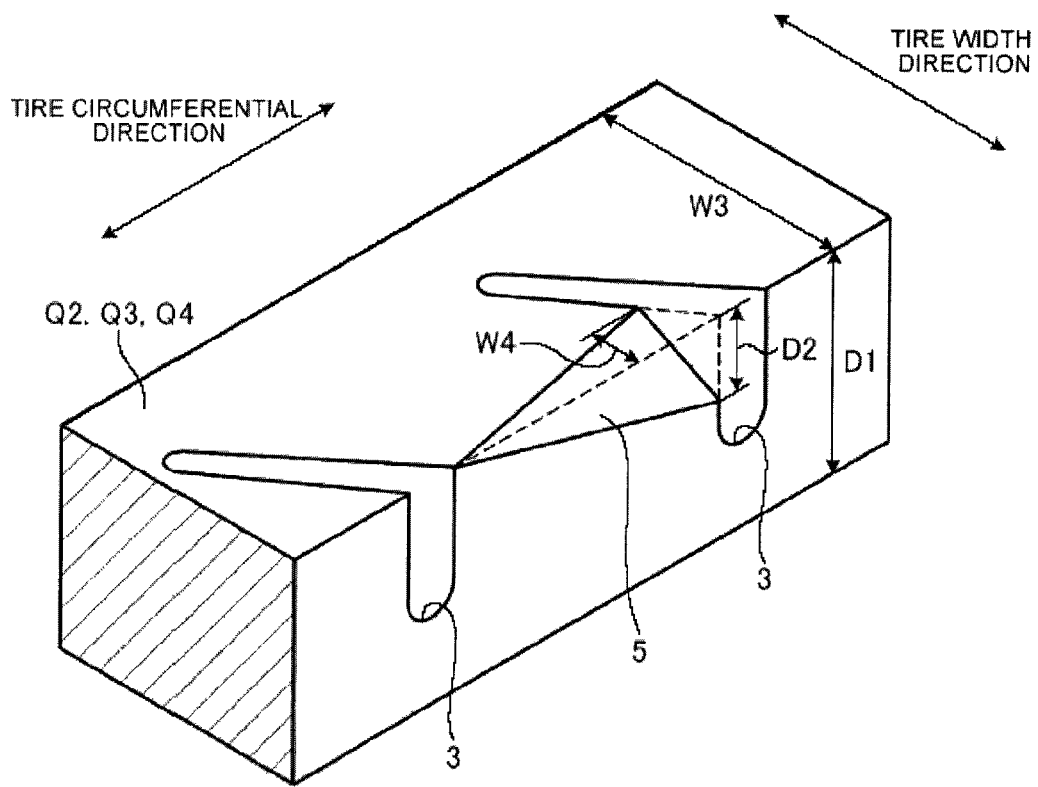
FIG. 3 is a schematic perspective view showing a chamfer.

FIG. 1 is a plan view partially showing a tread surface of a pneumatic tire according to the present embodiment. FIG. 2 is a plan view corresponding to FIG. 1 according to another embodiment of the present invention. FIG. 3 is a schematic perspective view showing a chamfer.

In the following explanation, "tire circumferential direction" is a circumferential direction having a rotational axis (not shown) of the pneumatic tire as a central axis. "Tire width direction" is a direction parallel to the rotational axis, "tire width direction inner side" is a side heading toward a tire equator CL in the tire width direction, and "tire width direction outer side" is a side going away from the tire equator CL in the tire width direction. Furthermore, "vehicle outer side" is a section of the pneumatic tire positioned on an outer side of the vehicle in the tire width direction when mounted on a vehicle and "vehicle inner side" is a section of the pneumatic tire positioned on an inner side of the vehicle in the tire width direction when mounted on a vehicle. In the present embodiment, the vehicle outer side is also called "first tire width direction side" and the vehicle inner side is also called "second tire width direction side."

In FIG. 1, four main grooves G1, G2, G3, and G4 extending linearly in the tire circumferential direction are provided in a ground contact region R of a tread surface 1 of the pneumatic tire according to the present embodiment, and the tread surface 1 is partitioned into five land portions Q1, Q2, Q3, Q4, and Q5 by these main grooves G1, G2, G3, and G4.

Also, in the pneumatic tire according to the present embodiment, when mounted on a vehicle, the land portion Q1 positioned outermost on the vehicle outer side (first tire width direction side) among the five land portions Q1, Q2, Q3, Q4, and Q5 extends in the tire width direction and is formed into a block row by being partitioned by lug grooves 2 positioned at a given spacing in the tire circumferential direction. The other land portions Q2, Q3, Q4, and Q5 are formed into continuous ribs in the tire circumferential direction. The rigidity of the land portions Q2, Q3, Q4, and Q5 in the tread surface 1 is thereby guaranteed, thus making it possible to improve steering stability performance on dry road surfaces. In the pneumatic tire according to the present embodiment, a mounting position on a vehicle is preferably designated when mounting on a vehicle.

Furthermore, in the pneumatic tire according to the present embodiment, centers (illustrated with double-dashed lines in FIG. 1) of the two main grooves G2 and G3 positioned on the tread center side among the main grooves G1, G2, G3, and G4 sandwich the tire equator CL and are formed in positions removed from the tire equator CL by from 8 to 12% and preferably from 9 to 10% of a tire ground contact width W. Specifically, as shown in FIG. 1, a ratio W1/W of spacings W1 in the tire width direction from the centers of the main grooves G2 and G3 to the tire equator CL and of a tire ground contact width W is set within a range from 8 to 12% and is preferably from 9 to 10%.

Also, in the pneumatic tire according to the present embodiment, the centers (illustrated with double-dashed lines in FIG. 1) of the two main grooves G1 and G4 positioned on both shoulder sides among the main grooves G1, G2, G3, and G4 are formed in positions removed from the tire equator CL by from 18 to 32% and preferably from 20 to 31% of the tire ground contact width W. Specifically, as shown in FIG. 1, a ratio W2/W of spacings W2 in the tire width direction from the centers of the main grooves G1 and G4 to the tire equator CL and of the tire ground contact width W is set within a range from 18 to 32% and is preferably from 20 to 31%.

Furthermore, in the pneumatic tire according to the present embodiment, a ratio Wmax/Wout of a maximum groove width Wmax of the three main grooves G2, G3, and G4, and a groove width Wout of the main groove G1 positioned outermost on the vehicle outer side is set from 2.0 to 3.0 and preferably from 2.25 to 2.55 by the main groove G1 positioned outermost on the vehicle outer side being formed with a groove width less than the groove widths of the other three main grooves G2, G3, and G4.

Since decrease in the rigidity of the outermost land portion Q1 on the vehicle outer side consisting of the block row is minimized by thus forming the main groove G1 positioned outermost on the vehicle outer side with a groove width less than the groove widths of the other three main grooves G2, G3, and G4 among the four main grooves G1, G2, G3, and G4, drainage can be guaranteed by the arrangement of the lug grooves 2 without a decrease in steering stability performance on dry roads, thus making improvement in steering stability performance on wet road surfaces possible.

When the spacings W1 in the tire width direction from the tire equator CL to the centers of the main grooves G2 and G3 are less than 8% of the tire ground contact width, steering stability performance on dry road surfaces decreases, and when such exceed 12%, steering stability performance on wet road surfaces decreases. Also, when the spacings W2 in the tire width direction from the tire equator to the centers of the main grooves G1 and G4 are less than 18% or exceed 22% of the tire ground contact width W, the balance between steering stability performance on dry road surfaces and steering stability performance on wet road surfaces is lost. Furthermore, when the aforementioned ratio Wmax/Wout is less than 2.0, steering stability performance on wet road surfaces decreases, and when such exceeds 3.0, steering stability performance on dry road surfaces decreases.

Also, in the pneumatic tire of the present embodiment, a ratio Sin/Sout of a groove area proportion Sin on the vehicle inner side (second tire width direction side) and a groove surface area Sout on the vehicle outer side in the ground contact region R when the tire equator CL is the center is set from 1.25 to 1.35 and preferably from 1.30 to 1.34. Furthermore, in the pneumatic tire of the present embodiment, groove area proportions in the ground contact region R of the three land portions Q2, Q3, Q4 excluding those innermost on the vehicle inner side and outermost on the vehicle outer side among the five land portions Q1, Q2, Q3, Q4, Q5 are larger for Win on the vehicle inner side than Wout on vehicle outer direction with the center lines (illustrated with double-dashed lines in FIG. 1) of the land portions as boundaries. Note that in the pneumatic tire of the present embodiment, the center line of the center land portion Q3 in the tire width direction matches the tire equator CL.

It is thereby possible to achieve well-balanced high level performance of both steering stability performance on dry road surfaces and steering stability performance on wet road surfaces. When the aforementioned ratio Sin/Sout is less than 1.25 or exceeds 1.35, the balance between steering stability performance on dry road surfaces and steering stability performance on wet road surfaces is lost.

The aforementioned tire ground contact width W means the maximum linear distance in the tire width direction of a ground contact surface formed on a flat plate when, after the tire is filled to an air pressure corresponding to a maximum load capacity defined by JATMA and placed perpendicularly on a flat plate in a motionless state, a load corresponding to 80% of the maximum load capacity is placed thereon. Also, the groove area proportion is the groove open section opening out in the ground contact region R with respect to the area of a given range in the ground contact region R.

In the present embodiment, inclined grooves 3 that extend from the main grooves G2, G3, and G4 on the vehicle inner side toward the vehicle outer side and that terminate in the land portions Q2, Q3, and Q4 are formed at a given spacing in the tire circumferential direction in the three land portions Q2, Q3, and Q4 excluding those innermost on the vehicle inner side and outermost on the vehicle outer side among the five land portions Q1, Q2, Q3, Q4, and Q5 as shown in FIG. 1. Furthermore, lug grooves 4 that extend from the vehicle inner side end toward the vehicle outer side and that terminate in the land portion Q5 may be formed at a given spacing in the tire circumferential direction in the land portion Q5 positioned innermost on the vehicle inner side. Steering stability performance on wet road surfaces can thereby be assuredly improved.

When the inclined grooves 3 are formed in the land portions Q2, Q3, and Q4 and the lug grooves 4 are formed in the land portion Q5, as disclosed above, such that the steering stability performance on dry road surfaces is not inhibited by a decrease in the rigidity of the land portions Q2, Q3, Q4, and Q5 by the formation of these inclined grooves 3 and lug grooves 4, a number and groove width of these inclined grooves 3 and lug grooves 4 are set appropriately within the limitations of the aforementioned groove area proportions. The groove width of the inclined grooves 3 may be set from about 2 to 7 mm, for example, based on the tire size. Furthermore, the groove width of the inclined grooves 3 may be formed so as to taper from the main grooves G2, G3, and G4 side toward the inner side of the land portions Q2, Q3, and Q4.

In the present embodiment, more preferably, the difference in the groove area proportion between Win on the vehicle inner side and Wout the vehicle outer side with the center line as the boundary for the three land portions Q2, Q3, and Q4 excluding those innermost on the vehicle inner side and outermost on the vehicle outer side among the aforementioned five land portions Q1, Q2, Q3, Q4, and Q5 is adjusted so as to be from 4.5 to 5.5% for the innermost land portion Q2 on the vehicle inner side, and from 12.0 to 14.0% for the other land portions Q3 and Q4. The balance between steering stability performance on dry road surfaces and steering stability performance on wet road surfaces can be further improved thereby.

More preferably, the groove width of the lug grooves 2 partitioning the land portion Q1 positioned outermost on the vehicle outer side may be formed so as to gradually increase from the main groove G1 positioned outermost on the vehicle outer side toward the vehicle outer side. In this case, it may be set so that a ratio x/y of a maximum value x to a minimum value y of the groove width of the lug grooves 2 is from 1.4 to 2.5 and preferably from 1.65 to 2.50.

Drainage can thereby be increased without decreasing steering stability performance on dry road surfaces. Thus, steering stability performance on wet road surfaces can be further improved. There are no particular limitations on the aforementioned maximum value x and minimum value y of the groove width of the lug grooves 2, and the maximum value x may be set to about 3 mm and the minimum value y to about 1.5 mm, for example.

FIG. 2 is a plan view of the tread surface of a pneumatic tire according to another embodiment. FIG. 3 is a schematic perspective view showing a chamfer. In the three land portions Q2, Q3, and Q4 excluding those innermost on the vehicle inner side and outermost on the vehicle outer side among the five land portions Q1, Q2, Q3, Q4, and Q5 of the another embodiment, chamfers 5 cut out in triangular shapes groove walls of the inclined grooves 3 as bottom surfaces are formed in corners on an acute angle side formed by the main grooves G2, G3, G4 and the inclined grooves 3. It is thereby possible to further increase drainage simultaneously with being able to prevent uneven wear of the corners on the acute angle side of the land portions Q2, Q3, and Q4 effectively.

There are no particular limitations on the form of the chamfers in this case. Other than a triangular form, an edge of the inner surface side of the land portions Q2, Q3, and Q4, not limited to linear form, can be formed into an arched form (curved form), stepped form, or the like which, while gradually separating from the inclined grooves 3, approaches the main grooves. Furthermore, as shown in FIG. 2, triangular chamfers 5' cut out in triangular shapes having the groove walls of the lug grooves 2 as bottom surfaces may also be formed in the corners on the acute angle side formed by the lug grooves 2 partitioning the land portion Q1 and the main groove G1. Drainage can be further improved thereby.

In the aforementioned case, as shown in FIG. 3, the size of the chamfers 5 may be set so that a cut out bottom surface width W4 in the tire width direction is 8 to 15% of a width W3 of the land portions Q1, Q2, Q3, and Q4, and set so that a maximum depth D2 thereof is from 25 to 35% of a depth D1 of the main grooves G1, G2, G3, and G4. Drainage can be assuredly improved thereby.

In the present invention, more preferably, by changing a pitch spacing (tire circumferential direction spacing) P1 between the lug grooves 4 in the innermost land portion Q5 on the vehicle inner side and a pitch spacing (tire circumferential direction spacing) P2 between the lug grooves 2 in the outermost land portion Q1 on the vehicle outer side within the limitations of the aforementioned groove area proportions, the tire circumferential direction spacing P1 of the lug grooves 4 in the innermost land portion Q5 on the inner vehicle side may be set smaller than the tire circumferential direction spacing P2 of the lug grooves 2 in the outermost land portion Q1 on the vehicle outer side.

Noise characteristics accompanying pitch noise can thereby be effectively improved. In this case, there are no particular limitations on the tire circumferential direction spacing of the lug grooves 2 and 4. The total number of lug grooves provided in the land portion Q1 may be set from about 58 to 62 on the tire circumference and the total number of lug grooves 4 provided in the land portion Q5 may be set from 70 to 74 on the tire circumference.

EXAMPLES

Using 245/40R18 as the tire size and FIG. 1 as the basic form of the tread pattern, the tires of the present invention grooves G1, G2, G3, and G4 in the comparative tires were G1=G2=G3=G4=14.0 mm. Also, the difference of the groove area proportion between the vehicle inner side and the vehicle outer side with the tire width direction center line as the boundary of the land portions Q2, Q3, and Q4 of the present invention tires and the tires of Comparative Examples 3 and 4 was set so as to be 5.0% in the land portion Q2 and 13.0% in the land portions Q3 and Q4. Furthermore, in Comparative Examples 1 and 2 to 4 (FIGS. 4 to 7) and Examples 1 to 4 (FIG. 1) an entirety of the groove surface proportion was set so as not to change. In contrast, in Examples 5 to 8 (FIG. 2), the entirety of the groove surface proportion increased slightly 3%, this being only the amount of the chamfers.

Steering stability on dry road surfaces and steering stability on wet road surfaces were evaluated using the test methods below for these twelve types of tires, and the results thereof are disclosed in Table 1 as indices with Comparative Example 1 as 100. Larger values indicate superior stability.

Steering Stability on Dry Road Surface

After fitting each of the tires onto a rim (18×8.5 JJ) and inflating to a filled air pressure of 230 kPa, such was fitted to front and back wheels of a vehicle (engine displacement: 3,200 cc). An experienced test driver then performed sensory evaluation by driving on a test course consisting of a dry asphalt road surface while changing the speed within a range from 0 to 200 km/h.

Steering Stability on Wet Road Surface

After fitting each of the tires onto a rim (18×8.5 JJ) and inflating to a filled air pressure of 230 kPa, such was fitted to the front and back wheels of a vehicle (engine displacement: 3,200 cc). An ABS braking test from a speed of 100 km/h was then performed on a test course consisting of an asphalt road surface with a water depth of from 2 to 3 mm and evaluation of steering stability on wet road surfaces was performed using the results thereof.

TABLE 1

| | Comp. Ex. 1* | Ex. 1 | Ex. 2 | Ex. 3 | Ex. 4 | Ex. 5 | Ex. 6 | Ex. 7 | Ex. 8 | Comp. Ex. 2 | Comp. Ex. 3 | Comp. Ex. 4 |
|---|---|---|---|---|---|---|---|---|---|---|---|---|
| Tread Pattern | FIG. 4 | FIG. 1 | FIG. 1 | FIG. 1 | FIG. 1 | FIG. 2 | FIG. 2 | FIG. 2 | FIG. 2 | FIG. 5 | FIG. 6 | FIG. 7 |
| $S_{in}/S_{out}$ | 1 | 1.25 | 1.3 | 1.34 | 1.35 | 1.25 | 1.3 | 1.34 | 1.35 | 1 | 1.08 | 1.05 |
| Steering Stability on Dry Road Surface | 100 | 109 | 108 | 105 | 104 | 109 | 108 | 107 | 106 | 95 | 97 | 98 |
| Steering Stability on Wet Road Surface | 100 | 104 | 105 | 108 | 109 | 106 | 107 | 108 | 109 | 108 | 106 | 107 |

*"Comp." as used in Table 1 is an abbreviation for "Comparative", and "Ex." as used in Table 1 is an abbreviation for "Example"

Figure 4:
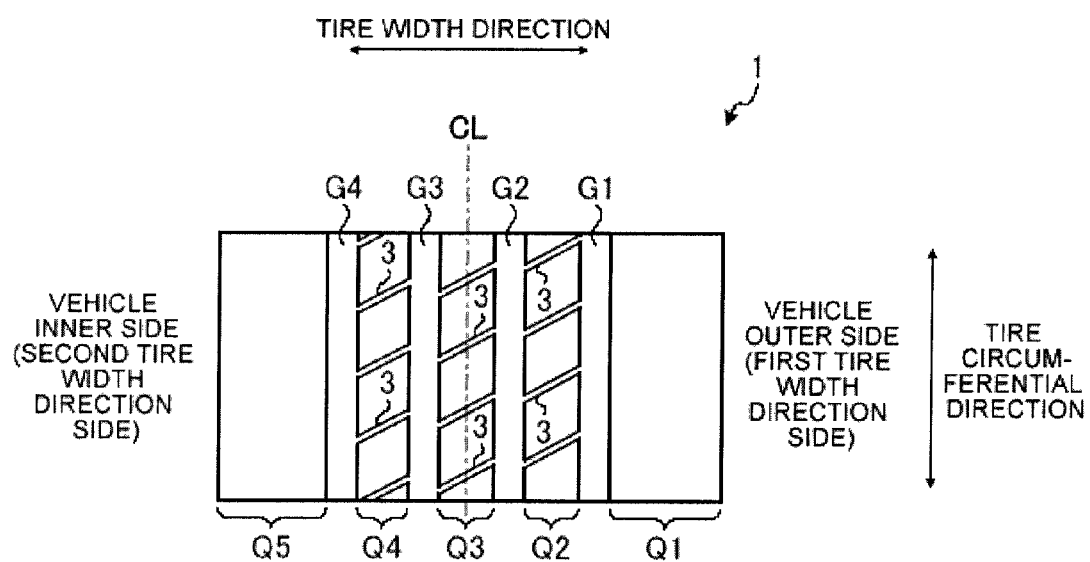
FIG. 4 is a plan view showing the tread surface of the tire of Comparative Example 1 used in the embodiments.
Figure 5:
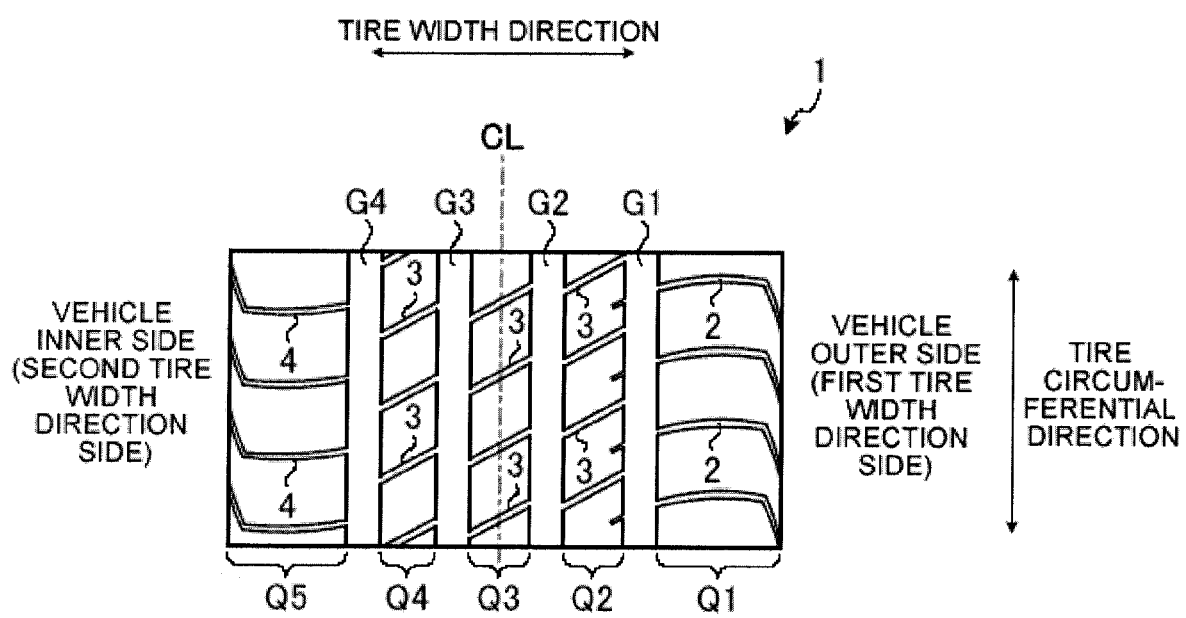
FIG. 5 is a plan view showing the tread surface of the tire of Comparative Example 2 used in the embodiments.
Figure 6:
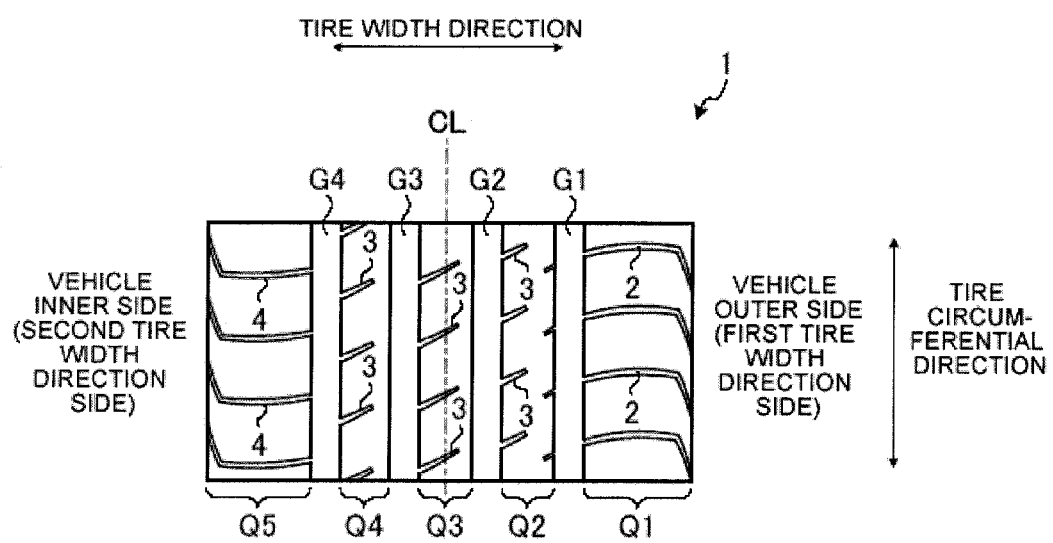
FIG. 6 is a plan view showing the tread surface of the tire of Comparative Example 3 used in the embodiments.
Figure 7:
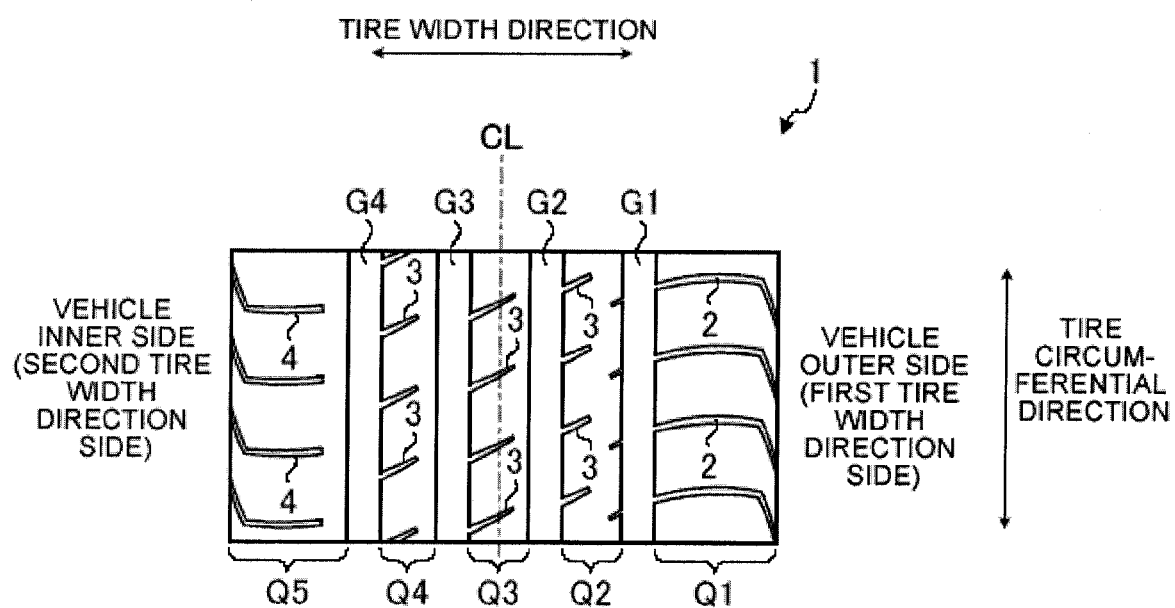
FIG. 7 is a plan view showing the tread surface of the tire of Comparative Example 4 used in the embodiments.

(Examples 1 to 8) consisting of the pattern configurations shown in FIG. 1 and FIG. 2; a comparative tire (Comparative Example 1) having identical groove widths for main grooves G1, G2, G3, and G4 and having a pattern configuration as shown in FIG. 4 wherein the inclined grooves 3 are connected to the main grooves G1, G2, and G3 and the lug grooves 2 and 4 are not provided; a comparative tire (Comparative Example 2) consisting of a pattern configuration as shown in FIG. 5 having the lug grooves 2 and 4 connected to the main grooves G1 and G4 on both shoulder sides of FIG. 4; a comparative tire (Comparative Example 3) consisting of a pattern configuration as shown in FIG. 6 having the lug grooves 4 of FIG. 1 connected to the main groove G4, and a comparative tire (Comparative Example 4) consisting of a pattern configuration as shown in FIG. 7 equivalent to FIG. 1 were prepared.

The widths of the main grooves G1, G2, G3, and G4 in the present invention tires were G1=7.1 mm, G2=16.4 mm, G3=16.4 mm, and G4=15.8 mm. The widths of the main It is evident from Table 1 that the tires of the present invention achieve both steering stability on dry road surfaces and steering stability on wet road surfaces in good balance compared to the comparative tires.

INDUSTRIAL APPLICABILITY

As disclosed above, the pneumatic tire of the present invention is suitable for achieving a high level of performance in both steering stability performance on dry road surfaces and steering stability performance on wet road surfaces.

What is claimed is:
1. A pneumatic tire comprising:
    four main grooves that are in a ground contact region of a tread surface and that extend linearly in a tire circumferential direction; and
    five land portions on the tread surface partitioned by the main grooves, wherein centers of two main grooves positioned on a tread center side among the four main grooves sandwich a tire equator and are formed in positions removed from the tire equator by from 8 to 12% of a tire ground contact width, centers of two main grooves positioned on both shoulder sides are formed in positions removed from the tire equator by from 18 to 32% of the tire ground contact width, and a groove width of a main groove positioned at a first farthest tire width direction side is less than groove widths of the other three main grooves so that a ratio Wmax/Wout of a maximum groove width Wmax of the three main grooves to a groove width Wout of the main groove positioned at the first farthest tire width direction side is set to from 2.0 to 3.0;

only a land portion positioned at the first farthest tire width direction side among the five land portions is formed into a block row by being partitioned with lug grooves at a given spacing in the tire circumferential direction, and the other four land portions are formed into continuous ribs in the tire circumferential direction; and a ratio Sin/Sout of a groove area proportion Sin on a second tire width direction side to a groove area proportion Sout on a first tire width direction side when the tire equator is taken as a center in the ground contact region is set to from 1.25 to 1.35, and groove area proportions of ground contact regions of the three land portions excluding those at the first farthest tire width direction side and a second farthest tire width direction side among the five land portions are larger in the second tire width direction side than the first tire width direction side with center lines of the land portions as boundaries.

2. The pneumatic tire according to claim 1, wherein inclined grooves are formed in the three land portions excluding those at the second farthest tire width direction side and the first farthest tire width direction side among the five land portions, the inclined grooves extending from main grooves on the second tire width direction side toward the first tire width direction side and terminating in the land portions and formed at a given spacing in the tire circumferential direction, and lug grooves are formed in a land portion positioned at the second farthest tire width direction side, the lug grooves extending from the second tire width direction side toward the first tire width direction side and terminating in the land portion and formed at a given spacing in the tire circumferential direction.

3. The pneumatic tire according to claim 2, wherein a groove width of the inclined grooves is set between 2 mm and 7 mm.

4. The pneumatic tire according to claim 2, wherein the groove width of the inclined grooves is formed to taper from the main grooves side toward the inner side of the land portions.

5. The pneumatic tire according to claim 1, wherein, in the ground contact region of the three land portions excluding those at the second farthest tire width direction side and the first farthest tire width direction side among the five land portions, the difference in the groove area proportion between the second tire width direction side and the first tire width direction side of each land portion with the center line in the tire width direction as a boundary is from 4.5 to 5.5% for the land portion at the first farthest tire width direction side and from 12.0 to 14.0% for the other two land portions, respectively.

6. The pneumatic tire according to claim 1, wherein, in the ground contact region of the tread surface, the groove width of the lug grooves partitioning the land portion positioned at the first farthest tire width direction side are formed so as to gradually increase from the main groove positioned at the first farthest tire width direction side toward the first tire width direction side, and a ratio x/y of a maximum value x and a minimum value y of the groove width is from 1.4 to 2.5.

7. The pneumatic tire according to claim 6, wherein inclined grooves are formed in the three land portions and chamfers are formed in corners of an acute angle side formed by the inclined grooves and the main grooves.

8. The pneumatic tire according to claim 7, wherein the size of the chamfers is set so that a cut out bottom surface width in the tire width direction is 8 to 15% of a width of the land portions having the chamfers and a maximum depth thereof is from 25 to 35% of a depth of the main grooves.

9. The pneumatic tire according to claim 1, wherein a tire circumferential direction spacing of lug grooves in a land portion at the second farthest tire width direction side is less than a tire circumferential direction spacing of the lug grooves in the land portion at the first farthest tire width direction side.

10. The pneumatic tire according to claim 1, wherein, in the ground contact region of the three land portions excluding those at the second farthest tire width direction side and the first farthest tire width direction side among the five land portions, the difference in the groove area proportion between the second tire width direction side and the first tire width direction side of each land portion with the center line in the tire width direction as a boundary is from 4.5 to 5.5% for the land portion at the first farthest tire width direction side and from 12.0 to 14.0% for the other two land portions, respectively.

11. The pneumatic tire according to claim 10, wherein, in the ground contact region of the tread surface, the groove width of the lug grooves partitioning the land portion positioned at the first farthest tire width direction side are formed so as to gradually increase from the main groove positioned at the first farthest tire width direction side toward the first tire width direction side, and a ratio x/y of a maximum value x and a minimum value y of the groove width is from 1.4 to 2.5.

12. The pneumatic tire according to claim 10, wherein inclined grooves are formed in the three land portions and chamfers are formed in corners of an acute angle side formed by the inclined grooves and the main grooves.

13. The pneumatic tire according to claim 1, wherein the centers of the two main grooves are formed in positions removed from the tire equator by from 9 to 10% of a tire ground contact width.

14. The pneumatic tire according to claim 1, wherein the centers of the two main grooves positioned on both shoulder sides are formed in positions removed from the tire equator by from 20 to 31% of the tire ground contact width.

15. The pneumatic tire according to claim 1, wherein the ratio Wmax/Wout is set from 2.25 to 2.55.

16. The pneumatic tire according to claim 1, wherein the ratio Sin/Sout is set from 1.30 to 1.34.

17. The pneumatic tire according to claim 1, wherein, in the ground contact region of the tread surface, the groove width of the lug grooves partitioning the land portion positioned at the first farthest tire width direction side are formed so as to gradually increase from the main groove positioned at the first farthest tire width direction side toward the first tire width direction side, and a ratio x/y of a maximum value x and a minimum value y of the groove width is from 1.65 to 2.5.

* * * * *